(12) United States Patent
Lingappa (10) Patent No.: US 10,534,522 B2
(45) Date of Patent: Jan. 14, 2020

(54) PINNING PORTIONS OF DATA VISUALIZATIONS

(71) Applicant: Harish Kumar Lingappa, Bangalore (IN)

(72) Inventor: Harish Kumar Lingappa, Bangalore (IN)

(73) Assignee: SAP SE (DE)

( * ) Notice: Subject to any disclaimer, the term of this patent is extended or adjusted under 35 U.S.C. 154(b) by 283 days.

(21) Appl. No.: 14/673,689

(22) Filed: Mar. 30, 2015

(65) Prior Publication Data

US 2016/0291845 A1 Oct. 6, 2016

(51) Int. Cl.
*G06F 3/0484* (2013.01)
*G06F 17/24* (2006.01)
*G06T 11/20* (2006.01)

(52) U.S. Cl.
CPC ...... *G06F 3/04845* (2013.01); *G06F 3/04842* (2013.01); *G06F 17/241* (2013.01); *G06T 11/206* (2013.01); *G06F 2203/04806* (2013.01)

(58) Field of Classification Search
CPC ............. G06F 17/241; G06F 17/30572; G06F 2203/04806; G06T 11/206
USPC .......................................... 715/232, 230, 233
See application file for complete search history.

(56) References Cited

U.S. PATENT DOCUMENTS

| | | | |
|---|---|---|---|
| 6,262,728 B1* | 7/2001 | Alexander | G01R 13/0245 345/440.1 |
| 7,961,188 B2* | 6/2011 | Tolle | G06Q 10/10 345/440 |
| 8,219,543 B2* | 7/2012 | Vanderport | G06F 17/2247 707/711 |
| 8,751,940 B2 | 6/2014 | Rose et al. | |
| 8,793,593 B2 | 7/2014 | Rasmussen et al. | |
| 2007/0250789 A1* | 10/2007 | Bell | G06F 3/0486 715/800 |
| 2008/0288886 A1* | 11/2008 | Sherwood | G06F 17/30958 715/772 |
| 2009/0055724 A1* | 2/2009 | Van ham | G06F 17/241 715/233 |
| 2010/0223577 A1* | 9/2010 | Bennett | G06F 3/0481 715/800 |
| 2010/0287493 A1* | 11/2010 | Majumder | G06F 3/0481 715/788 |

(Continued)

OTHER PUBLICATIONS

Suda, "The 37 Best Tools for Data Visualization," http://www.creativebloq.com/design-tools/data-visualization-712402, 42 pages (accessed Mar. 9, 2015).

(Continued)

*Primary Examiner* — Andrew L Tank
(74) *Attorney, Agent, or Firm* — Klarquist Sparkman, LLP (57) ABSTRACT

Examples of pinning portions of data visualizations are provided herein. A portion of interest of a data visualization can be selected, and a pinned portion can be generated that includes the portion of interest. A data visualization can be generated that represents data in a dataset. Instructions to select a portion of interest of the data visualization can be received. A pinned portion of the data visualization can then be generated. The pinned portion has pinned visualization content that includes at least some of the portion of interest of the data visualization. The pinned portion can be presented in association with the data visualization.

20 Claims, 11 Drawing Sheets

(56) References Cited

U.S. PATENT DOCUMENTS

| | | | |
|---|---|---|---|
| 2013/0326363 A1* | 12/2013 | Meintanis | G06F 17/30572 715/750 |
| 2014/0282184 A1* | 9/2014 | Dewan | G06F 3/0484 715/771 |
| 2015/0046856 A1* | 2/2015 | Rucker | G06F 3/0488 715/765 |

OTHER PUBLICATIONS

Henschen, "SAP Catches Data Visualization Wave," http://www.informationweek.com/software/information-management/sap-catches-data-visualization-wave/d/d-id/1104388, 10 pages (accessed Nov. 6, 2014).

Henschen, "How to Choose 'Advanced' Data Visualization Tools," http://www.informationweek.com/software/information-management/how-to-choose-advanced-data-visualization-tools/d/d-id/1105480, 12 pages (accessed Nov. 6, 2014).

\* cited by examiner

PINNING PORTIONS OF DATA VISUALIZATIONS

BACKGROUND

As computer hardware and software become increasingly advanced, the amount of data collected about a variety of things has grown substantially. Analytics software has been increasingly used to analyze and interpret such large amounts of data. Visualization applications, for example, can provide graphical representations of different aspects of data to allow a user to understand complicated relationships. Even with the tools available in conventional visualization applications, however, it can sometimes be difficult to quickly identify desired information in a data visualization, especially in a complex and/or frequently updated visualization.

DETAILED DESCRIPTION

The examples described herein generally allow portions of a data visualization to be pinned and presented in association with the data visualization. Data visualizations provide easy-to-understand, graphical representations of data that are useful for data analysis. In typical conventional data visualization applications, it can be difficult to quickly locate or understand information in, for example, complex or frequently updated visualizations.

In the described examples, a user can select and pin portions of a data visualization, allowing the user's attention to be quickly drawn to a desired portion of interest. As used herein, "pinning" a portion of a data visualization refers to creating a user interface element that includes content displayed in the portion of the visualization being pinned, the user interface element being presented in association with the visualization. The user interface element is referred to as a pinned portion. The content included in the pinned portion can be isolated, highlighted, detailed, simplified, zoomed, emphasized, etc. as compared to the way the corresponding content is displayed in the visualization. The pinned portion can be movable within the data visualization. Pinning the portion of the data visualization can also be performed without altering the corresponding portion of the data visualization. Examples of pinned portions are discussed in detail throughout this document.

A user who creates a data visualization illustrating production numbers for a large number of products may be interested in periodically (e.g. daily) viewing data for one product or a small number of products but may still wish to see a visualization that places the products of interest within the broader context of the large number of products. The sheer number of products illustrated in the visualization can make locating data for specific products of interest difficult and frustrating. Similarly, when the visualization is updated, visual clues relied on by the user to identify data of interest may change or disappear.

Rather than limiting the data visualization to displaying production numbers for the small group or single product of interest in an attempt to overcome these drawbacks, the described examples allow a user to continue to display the larger group of products but also create a pinned portion displaying data for the products of interest. The pinned portion can be saved in association with a visualization file, allowing the pinned portion to be presented with the data visualization when the visualization file is opened at a later time or by another user. The described examples allow a user to simultaneously view specific data of interest and a large amount of other data without having to waste the time and computing resources that would be required to maintain and open two separate visualization files. Examples are described below with reference to FIGS. 1-13.

Figure 1:
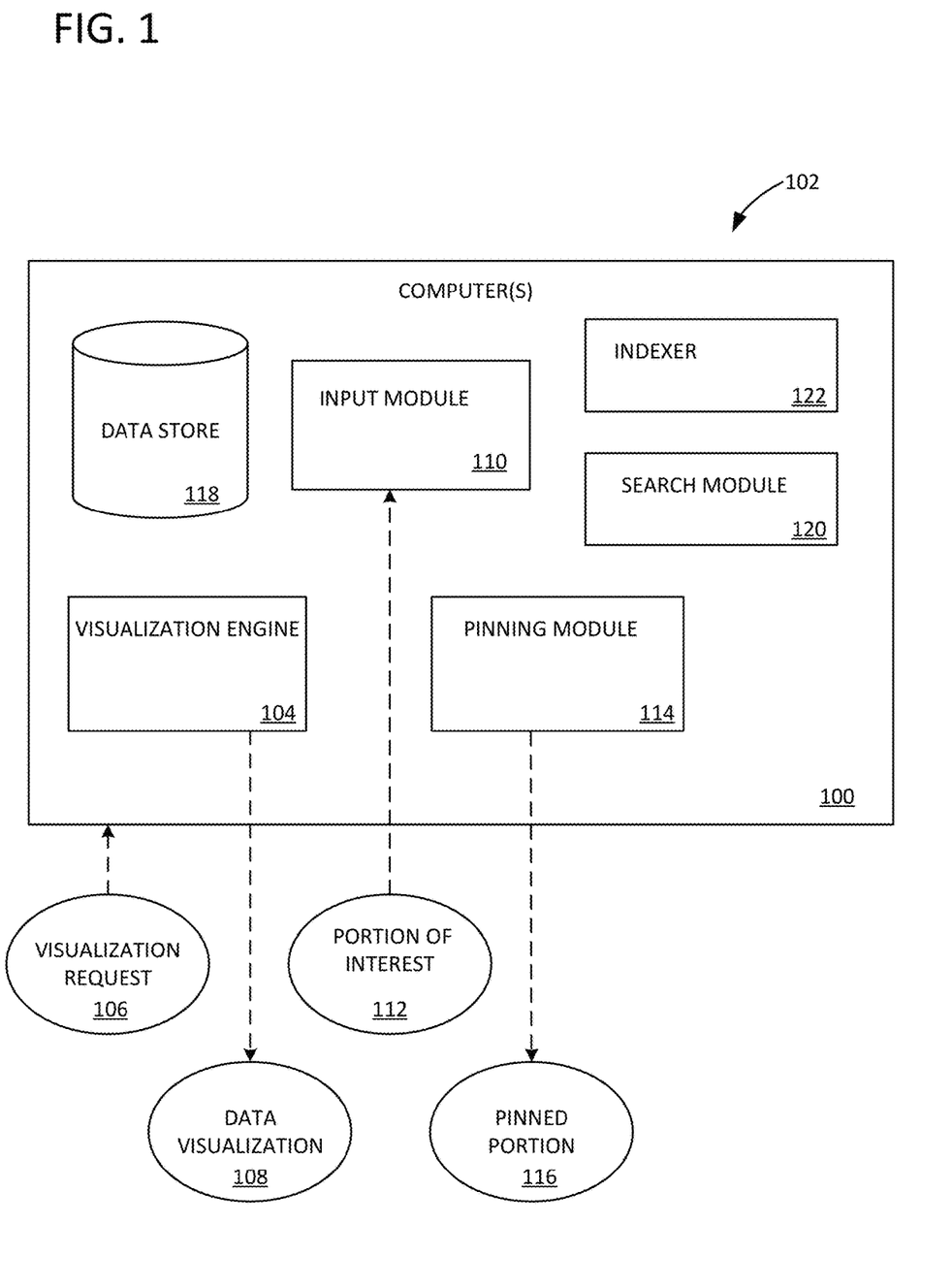
FIG. 1 is an example system configured to generate pinned portions of data visualizations.

FIG. 1 illustrates one or more computer(s) 100 implementing a system 102. System 102 includes a visualization engine 104 that, in response to a visualization request 106, generates a data visualization 108. A data visualization is a graphical representation of data, such as a chart, graph, or table. Data visualizations have one or more data visualization types, which can be, for example, a stacked column chart, a column chart, a three-dimensional column chart, a line chart, an area chart, a table, a pie chart, a donut chart, or other visualization types.

Data visualization 108 represents data in a dataset selected for display. The data can be specified, for example, in visualization request 106. Visualization request 106 can be specified by a user through a data visualization application or other software application having data visualization functionality. Such applications can be web applications provided over the Internet or can be installed on local computers or server computers accessible over a local area network (LAN) or other network. In some examples, visualization engine 104 and other components of system 102 are part of a data visualization application.

An input module 110 is configured to receive instructions selecting a portion of interest 112 of data visualization 108. The portion of interest 112 can be selected through a variety of actions, including mouse, hover, touch or other interactions with a control button, data label, or displayed portion of data visualization 108. In some examples, a user can select the portion of interest by drawing a selection box around a portion of data visualization 108.

Figure 4:
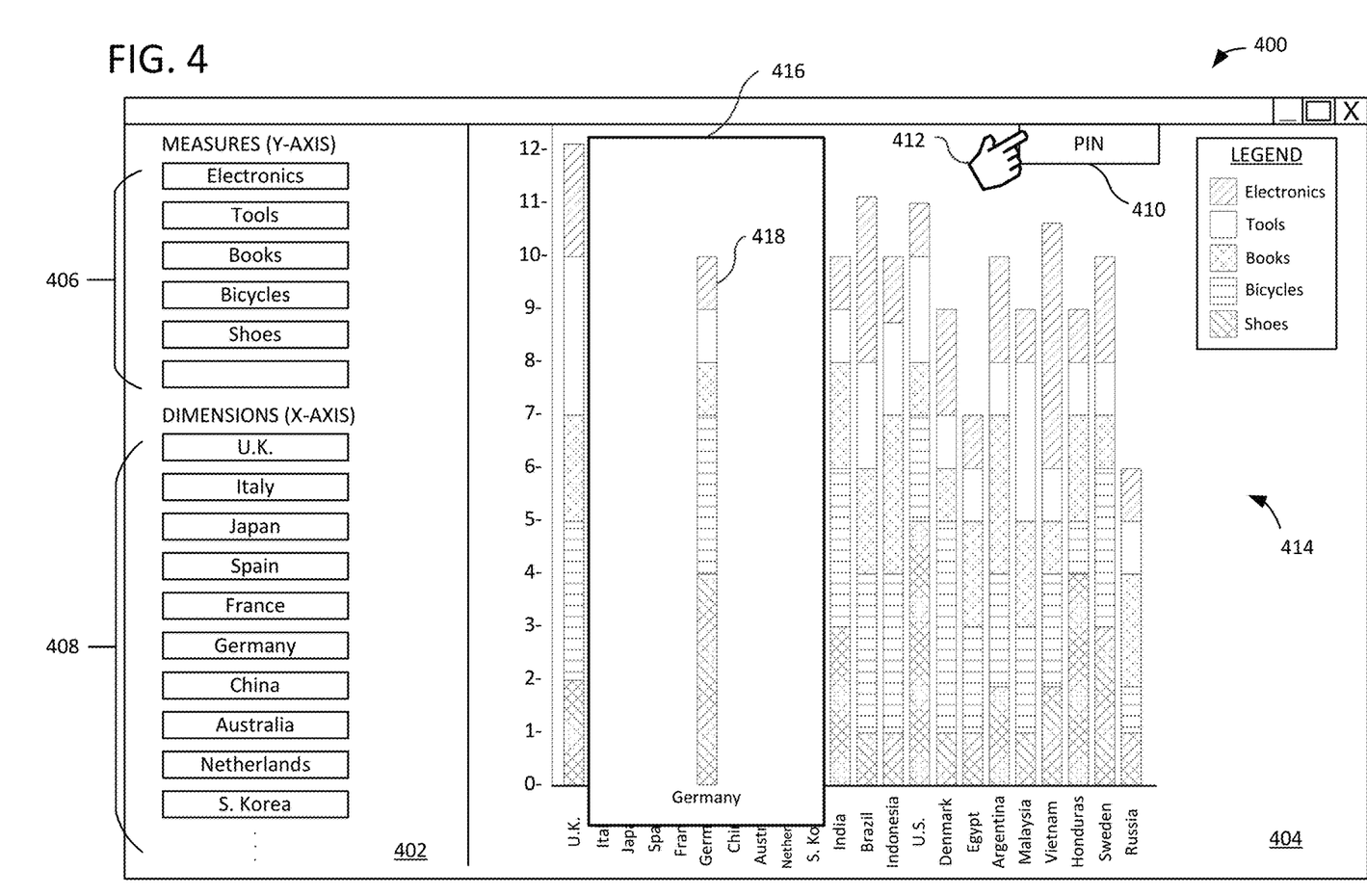
FIG. 4 shows an example of the user interface of FIG. 3 after a pinned portion of the data visualization has been generated.
Figure 5:
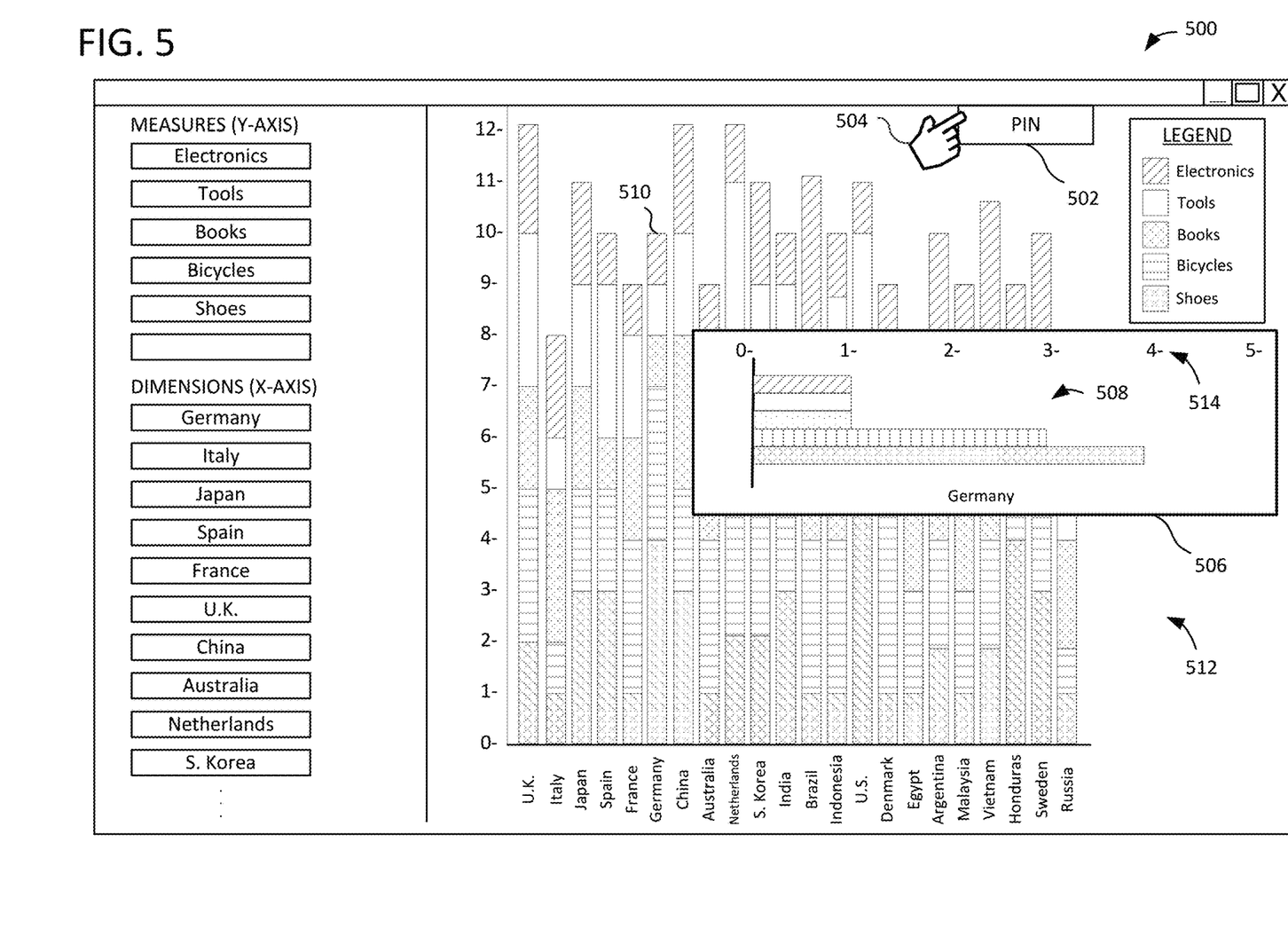
FIG. 5 shows another example the user interface of FIG. 3 after a pinned portion of the data visualization has been generated, the pinned portion being of a different visualization type than the data visualization.
Figure 11:
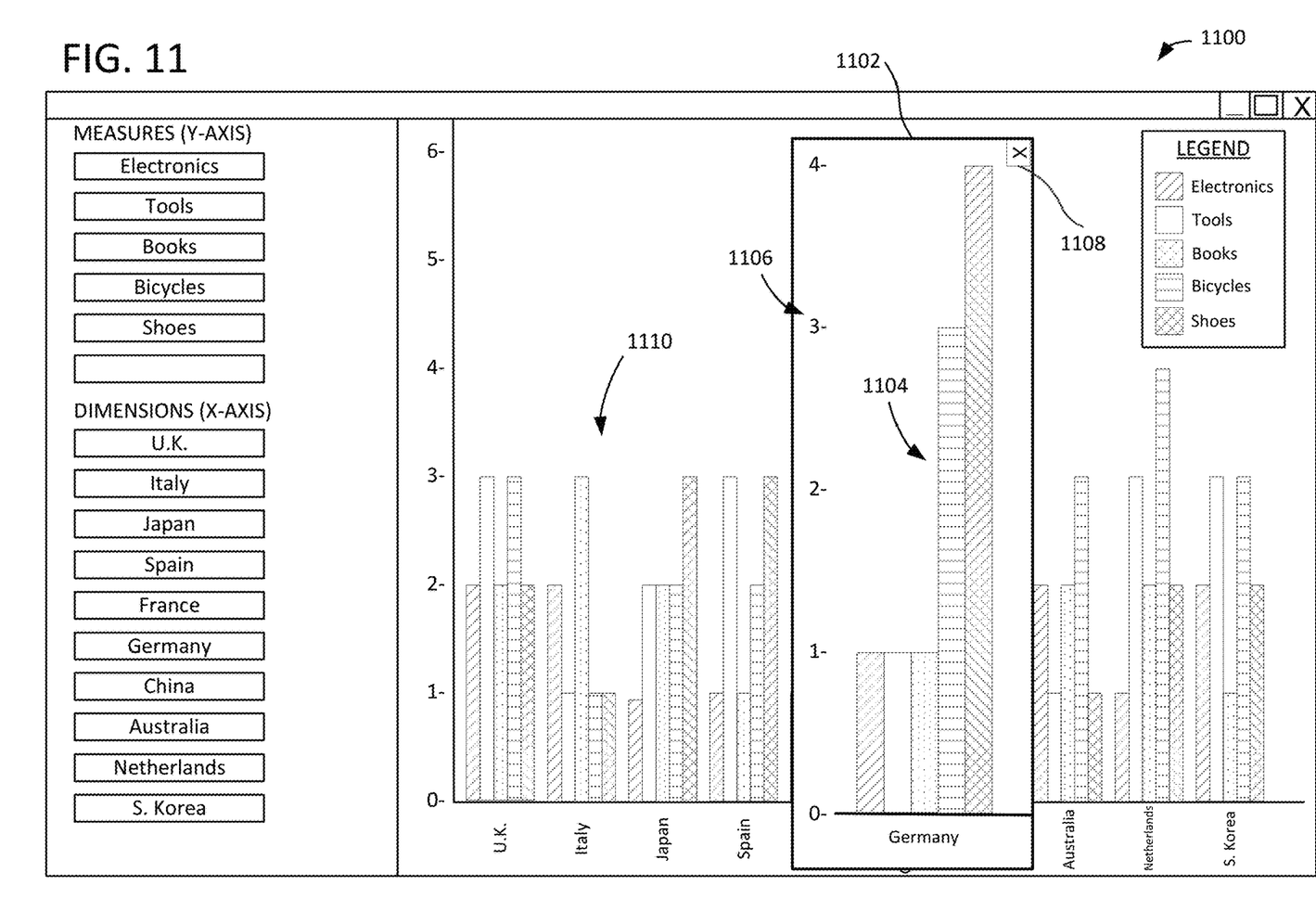
FIG. 11 shows an example of the user interface of FIG. 10 after a pinned portion of the data visualization has been generated, the pinned portion being zoomed in relative to the data visualization.

A pinning module 114 is configured to generate a pinned portion 116 based on selected portion of interest 112. Pinned portion 116 has pinned visualization content that is a subset of data visualization 108. For example, if data visualization 108 displays harvest information for a large number of crops, pinned portion 116 can comprise the visualization content of data visualization 108 corresponding to one crop or other subset of the large number of crops. Pinning module 114 is configured to present pinned portion 116 in association with data visualization 108. Example presentations of pinned portion 116 relative to data visualization 108 are illustrated in FIGS. 4, 5, and 11.

Figure 7:
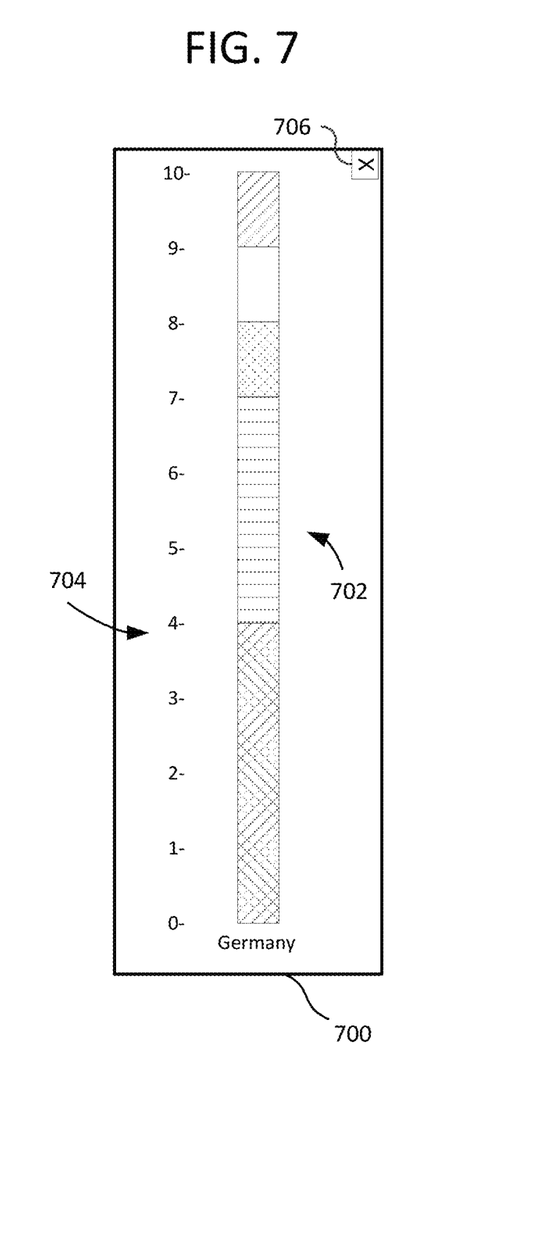

Pinned portion 116 can include a number of elements, including a zoom-level control that allows a user to zoom the pinned visualization content in and/or out, an unpin control, or a scale corresponding to the pinned visualization content. In some examples, pinned visualization content displayed in pinned portion 116 is zoomed in relative to data visualization 108. Examples of zoomed-in pinned visualization content are illustrated in FIGS. 5, 7, and 11. In some examples, pinned portion 116 is presented at least partially over selected portion of interest 112 of data visualization 108. In such configurations, pinned portion 116 can partially or entirely overlap selected portion of interest 112. Examples of such presentation are illustrated in FIGS. 4 and 11. Pinned portion 116 can be movable with respect to data visualization 108. In some examples, a user can drag-and-drop pinned portion 116 from one location to another within data visualization 108. Pinned portion 116 can also be resized in some examples, such as by selecting a size option from a menu or by dragging a boundary of pinned portion 116.

Data visualization 108 can be a plot of dimensions versus measures. In some examples, the pinned visualization content of pinned portion 116 represents at least one of a single measure and multiple dimensions or a single dimension and multiple measures. The terms "measures" and "dimensions" are well-known in analytics. As an example, in a visualization depicting population by city, the cities (x-axis) are dimensions and population (y-axis) is a measure. "Dimensions" used in this context does not refer to a geometric dimension such as a measurement of height, width, or length, or a state of being one-dimensional, two-dimensional (2D), or three-dimensional (3D).

In some examples, pinning module 114 is also configured to save pinned portion 116 in association with a visualization file (not shown) corresponding to data visualization 108. The visualization file can be saved, for example, in data store 118. The visualization file can also be referred to as a "chart" or a "report." Pinned portion 116 can be saved as a separate file (visualization file or other file) linked by a reference in the visualization file to the location or file name of the separate file or can be saved as part of the visualization file itself. After pinned portion 116 is saved, upon closing and reopening the visualization file, pinned portion 116 can be presented again in association with the data visualization 108. The dataset(s) being visualized in data visualization 108 can also be stored in data store 118. Data store 118 can be a database, such as an in-memory columnar relational database, and can be located, in some examples, external to computer(s) 100.

In some examples, pinning module 114 can generate multiple pinned portions for data visualization 108. For example, a user can select multiple, separate areas of data visualization 108 as portions of interest and generate corresponding multiple pinned portions. The multiple pinned portions can also be linked and saved together, even while appearing separately when presented in association with data visualization 108. In some examples, different users can access a visualization file, and the respective users can select different portions of interest and cause pinning module 114 to generate different pinned portions. A visualization application opening the visualization file can then load the pinned portion corresponding to the user who requested that the file be opened.

System 102 also comprises a search module 120 and an indexer 122. Search module 120 is configured to identify data visualization files having associated saved pinned portions. Metadata, file names, file extensions, or other aspects of data visualization files can indicate that a visualization file has an associated saved pinned portion. In some examples, search module 120 is configured to identify visualization files that have associated saved pinned portions that have certain keywords, authors, or other identifying information.

Cataloging of the characteristics of visualization files can be performed by indexer 122. Indexer 122 is configured to determine that a visualization file has an associated pinned portion and index the visualization file and the pinned portion. Indexer 122 can index based on at least one of: one or more labels or keywords associated with the pinned visualization content of the pinned portion, a user associated with the pinned portion, or the presence of the pinned portion.

In FIG. 1, the arrows indicating inputs and outputs of system 102 are only an example. Any of the components of system 102 can be in communication with any other components. In examples in which system 102 is implemented on multiple computer(s) 100 (e.g. multiple server computers), computers 100 can be in communication via a network (not shown). The network can be the Internet, a LAN, a wireless local area network (WLAN), a wide area network (WAN), or other type of network, wired or wireless. Visualization request 106 and portion of interest 110 can be received via the network, and data visualization 108 and pinned portion 116 can be provided via the network.

Figure 2:
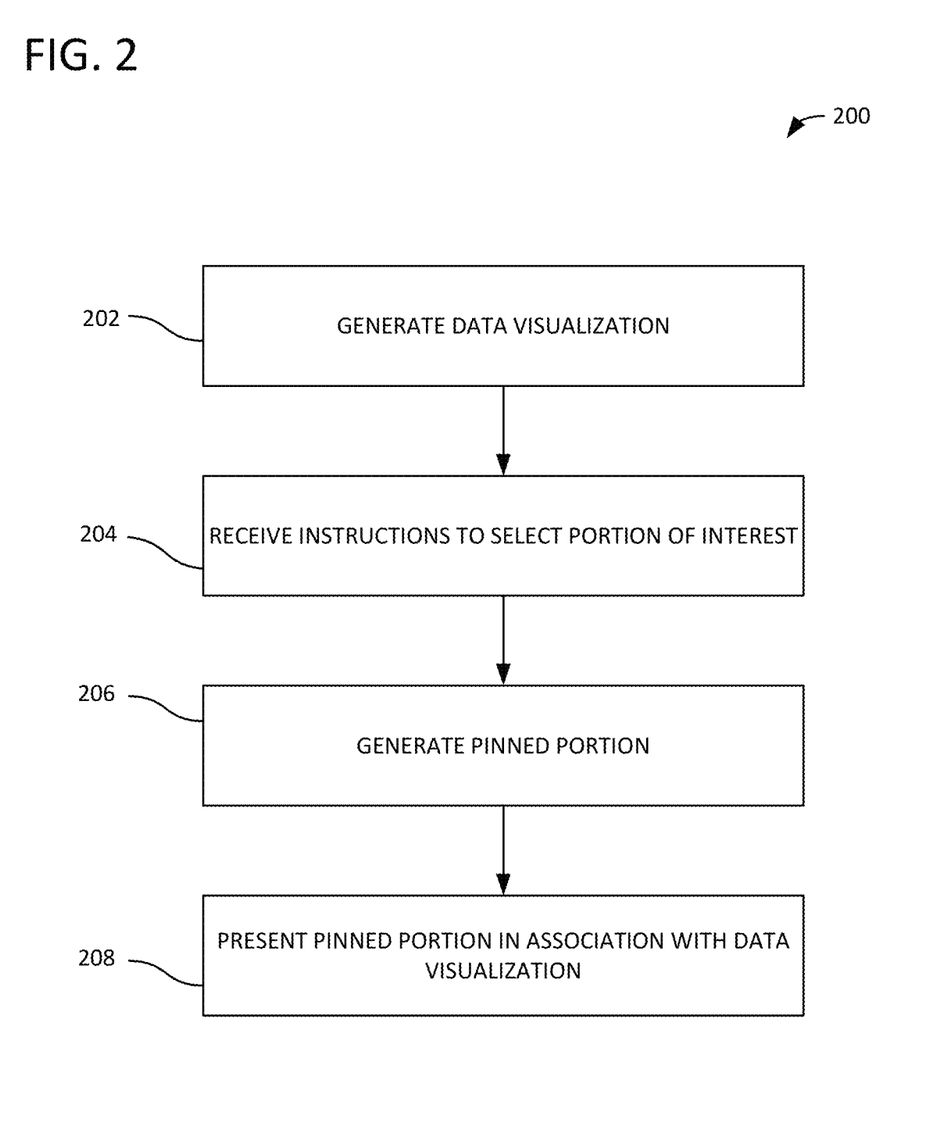
FIG. 2 illustrates an example method for pinning a portion of a data visualization.

FIG. 2 illustrates a method 200 of pinning a portion of a data visualization. In process block 202, a data visualization is generated. The data visualization represents data in a dataset. In process block 204, instructions to select a portion of interest of the data visualization are received. A pinned portion of the data visualization is generated in process block 206. The pinned portion has pinned visualization content comprising at least some of the portion of interest of the data visualization. In process block 208, the pinned portion is presented in association with the data visualization.

Method 200 can further comprise generating a second pinned portion. In such examples, instructions to select a second portion of interest of the data visualization are received. A second pinned portion of the data visualization is generated. The second pinned portion has second pinned visualization content comprising at least some of the second portion of interest of the data visualization. The second pinned portion is then presented in association with the data visualization. The pinned portion generated in process block 206 and the second pinned portion can be linked and saved together.

Figure 3:
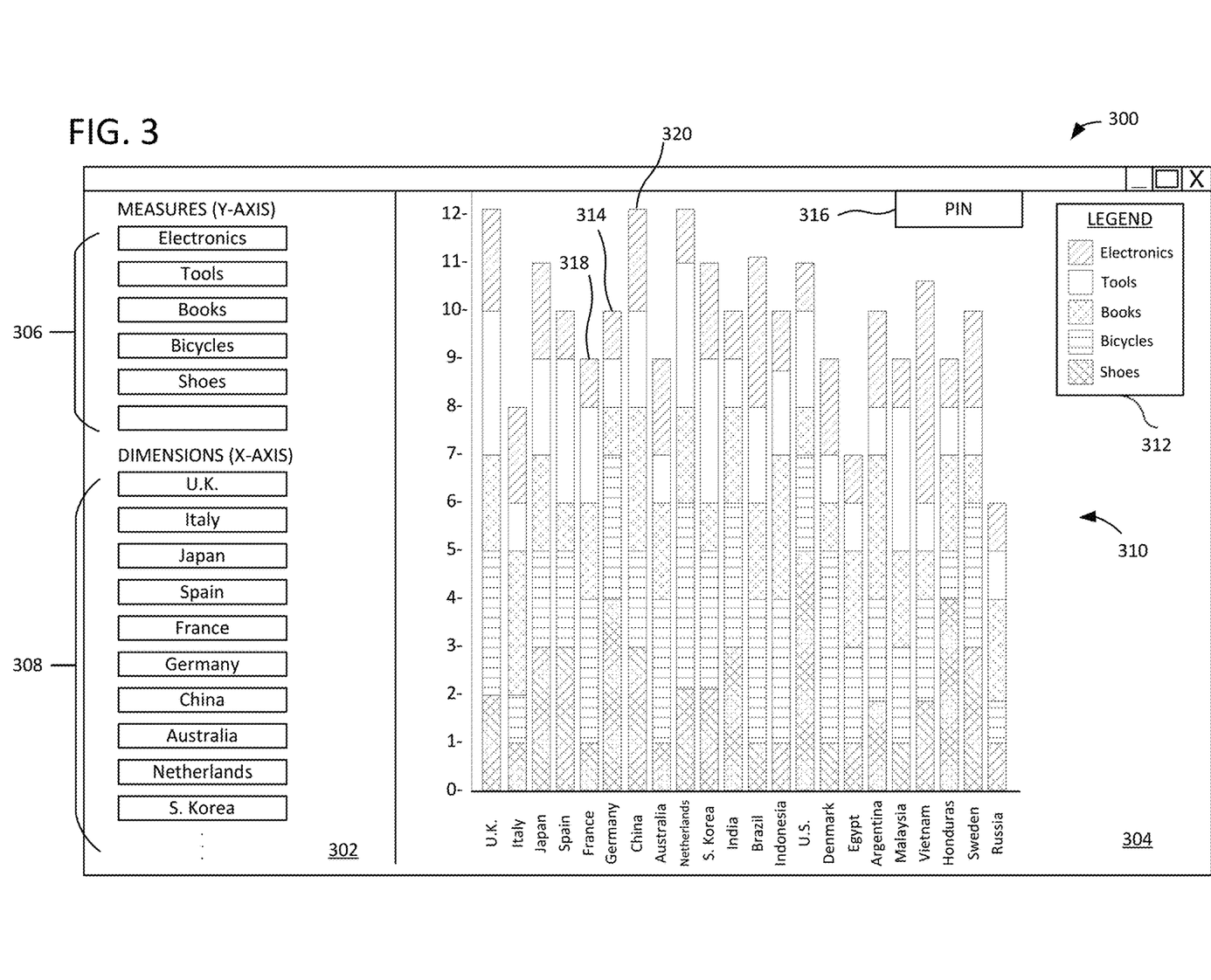
FIG. 3 is an example user interface of a visualization application in which a portion of a data visualization can be pinned, the data visualization having a stacked column visualization type.

FIG. 3 illustrates an example user interface 300 of an application. Interface 300 includes a data selection area 302 and a data visualization display area 304. Data selection area 302 includes a group of measures 306 and a group of dimensions 308. Group of measures 306 includes "electronics," "tools," "books," and "bicycles." Group of dimensions 308 includes "U.K.," "Italy," "Japan," "Spain," "France," etc. The measures included in group of measures 306 and the dimensions included in group of dimensions 308 can, for example, be selected by a user in order to create a data visualization 310.

Data visualization 310 is displayed in data visualization display area 304, along with a legend 312 corresponding to the measures shown in group of measures 306. Data visualization 310 is a stacked column chart in which each of the five measures in group of measures 306 are represented for each corresponding dimension as a portion of a single column. For example, column 314 illustrates the quantities of the measures for Germany, showing four units for shoes, three units for bicycles, one unit for books, one unit for tools, and one unit for electronics.

Pin control 316 allows a user to create a pinned portion (not shown) based on a selected portion of interest. A user can use a mouse or other input device, touch input, hover input, or other input to select the portion of interest. For example, a user can select pin control 316 and then select one or more of the dimensions in group of dimensions 308 by either selecting the dimensions from the list in data selection area 302 or selecting the corresponding stacked column chart or label in visualization display area 304. A pinned portion containing pinned visualization content of the selected dimension is then generated. As a specific example, a user can select pin control 316 and then either select "Germany" from list of dimensions 308 or select column 314 or the "Germany" label below column 314. A pinned portion including the selected portion of interest (column 314) is then generated.

In some examples, the generated pinned portion includes additional content adjacent to the selected portion of interest. Continuing with the example of column 314 being the selected portion of interest, the generated pinned portion can include columns 318, "France," and 320, "China." Adjacent areas can be included to provide additional context. In some examples, the selected portion of interest is bolded or otherwise emphasized relative to the adjacent areas and/or the adjacent areas are grayed out or otherwise de-emphasized relative to the selected portion of interest.

Although FIG. 3 includes pin control 316, various other options for initiating pinning functionality are also contemplated. Examples include: a pinning menu or menu option that can be selected; right-clicking, holding shift or control while clicking, use of a function key, or other actions or combination of actions; dragging and dropping selected content on a pin control; etc. In some examples, the portion of interest can be selected incrementally, such as by holding shift or another key and selecting each of multiple portions of interest (e.g., three different dimensions).

FIG. 4 illustrates user interface 400, which is similar to the user interface 300 of FIG. 3 with additional aspects visible related to pinning. Interface 400 includes a data selection area 402 and a data visualization display area 404. Group of measures 406 and group of dimensions 408 are the same as in FIG. 3.

In FIG. 4, a user interacts with pin control 410. The interaction is represented by pointer icon 412. The portion of data visualization 414 corresponding to Germany (the stacked bar chart illustrating the measures with respect to Germany) is the portion of interest in FIG. 4. As discussed above, different actions and order of user actions are contemplated to select a portion of interest and generate the corresponding pinned portion. In FIG. 4, for example, the user can select "Germany" from list of dimensions 408 or from data visualization 414 before or after interacting with pin control 410. Pinned portion 416 is generated in response to selection of the portion of interest and interaction with pin control 410.

Pinned portion 416 includes pinned visualization content 418. Pinned visualization content 418 includes the portion of interest selected from data visualization 414. In some examples, additional adjacent portions of data visualization 414 are included in pinned visualization content 418. Pinned portion 416 also includes white space or other non-content material that serves to emphasize pinned visualization content 418. The amount of white space or non-content material can vary and can be user-customizable. In FIG. 4, the scale of pinned visualization content 418 is the same as that of data visualization 414. In such cases, the information represented by pinned visualization content 418 can be understood without a scale being presented in pinned portion 416. In other examples, a scale is included in pinned portion 416.

In FIG. 4, pinned portion 416 is presented over the location of the Germany portion of the displayed content in data visualization 414. In some examples, pinned portion 416 is centered over the portion of interest of data visualization 414. In other examples, pinned portion 416 overlaps the portion of interest of data visualization 414 in an off-center position. In some examples, pinned portion 416 can be moved to a different area in user interface 400, for example by dragging-and-dropping pinned portion 416. In some examples, the dimensions of pinned portion 416 can be adjusted, for example through dragging a boundary of pinned portion 416 or selecting one of a number of size options. In this way, pinned portion 416 can be resized and moved to an area of user interface 400 that a user prefers.

As can be seen in FIG. 4, the effect of pinned portion 416 is that when a user views user interface 400 the portion of visualization 414 corresponding to a selected portion of interest (Germany) is quickly brought to the user's attention. Pinned portion 416 can be saved automatically upon generation. In some examples, pinned portion 416 is saved through explicit action (e.g., selecting a "save" option). Pinned portion 416, as well as other example pinned portions, can include a variety of other controls and information, including a scale, a zoom-level control, an unpin control, a save control, and/or a title. Various example pinned portions can include different combinations of such other controls and information. Example alternate pinned portions are shown in FIGS. 5-9 and 11.

FIG. 5 illustrates a user interface 500 similar to the user interface 300 of FIG. 3 in which a user has interacted with pin control 502 as shown by pointer 504 to generate pinned portion 506. Pinned portion 506 includes pinned visualization content 508 presented in a different visualization type (bar chart) as compared to column 510 (stacked column chart) of data visualization 512. In some examples, the visualization type in which the pinned visualization content of pinned portions will be displayed can be specified to be a certain type regardless of the visualization type of the underlying data visualization. Different visualization types can also be specified for different data characteristics. In some examples, the visualization type defaults or is limited to the visualization type of the underlying data visualization. In some examples, a visualization application displaying user interface 500 selects an alternative visualization type based on characteristics of the underlying data of the selected portion. For example, if a single dimension or single measure is selected, a pie chart can be used to present pinned visualization content 508.

Because of the change in visualization type, pinned visualization content 508 does not extend as far in a single direction as column 510, allowing pinned visualization content 508 to be zoomed-in relative to data visualization 512, as indicated by scale 514. Additionally, pinned portion 506 is horizontal, which may be preferred by some users. FIGS. 6-9 illustrate additional example pinned portions.

Figure 6:
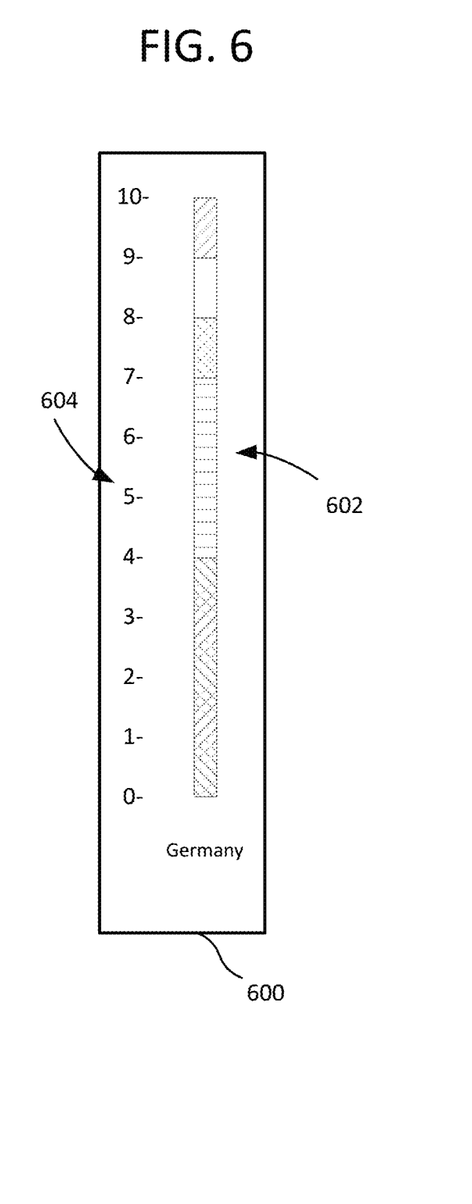
FIGS. 6-9 are example pinned portions.

FIG. 6 illustrates pinned portion 600. Pinned portion 600 includes pinned visualization content 602 and a scale 604. Pinned portion 600 includes less white space than pinned portion 416 of FIG. 4.

FIG. 7 illustrates pinned portion 700. Pinned portion 700 includes pinned visualization content 702, a scale 704, and an unpin control 706. Pinned portion 700 is zoomed in relative to data visualization 414 of FIG. 4 and includes less white space than pinned portion 416 of FIG. 4. Both pinned visualization content 602 of FIG. 6 and pinned visualization content 702 of FIG. 7 are of the same visualization type as data visualization 414 of FIG. 4.

Figure 8:
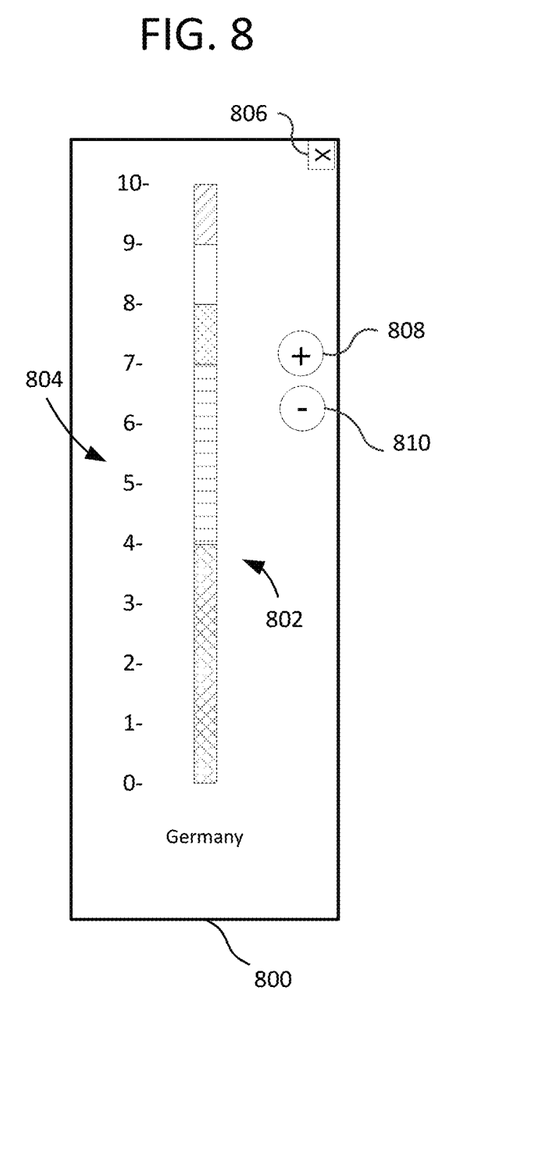

FIG. 8 illustrates pinned portion 800. Pinned portion 800 includes pinned visualization content 802, a scale 804, and an unpin control 806. Pinned portion 800 also includes a zoom-level control, shown as zoom-in button 808 and zoom-out button 810, although other types of zoom-level controls are also contemplated.

Figure 9:
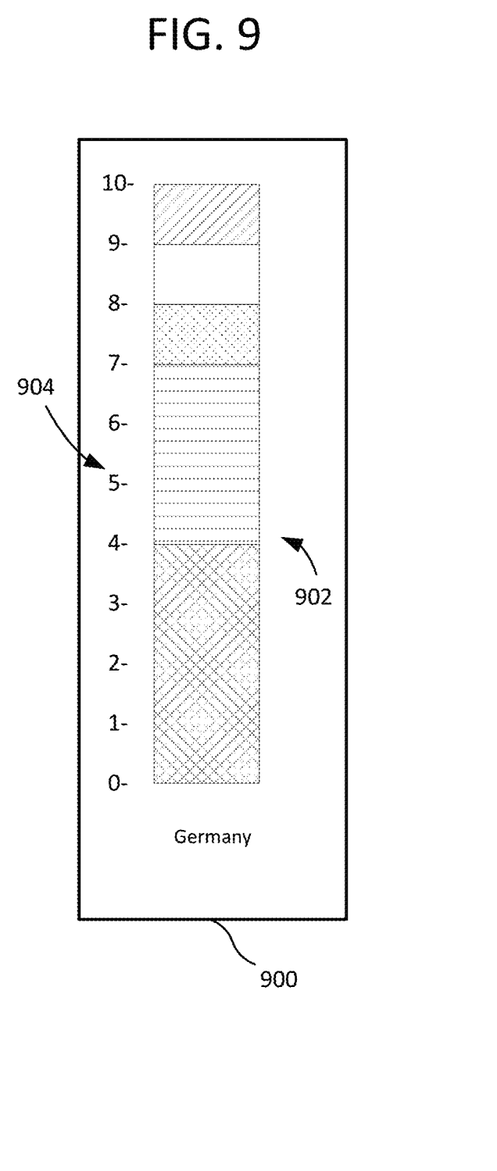

FIG. 9 illustrates pinned portion 900. Pinned portion 900 includes pinned visualization content 902 and a scale 904. Pinned visualization content 902 is wider than the corresponding area of data visualization 414 of FIG. 4. Pinned visualization content 902 can also be altered in other ways relative to the selected portion of interest, including stretching, bolding, etc.

Figure 10:
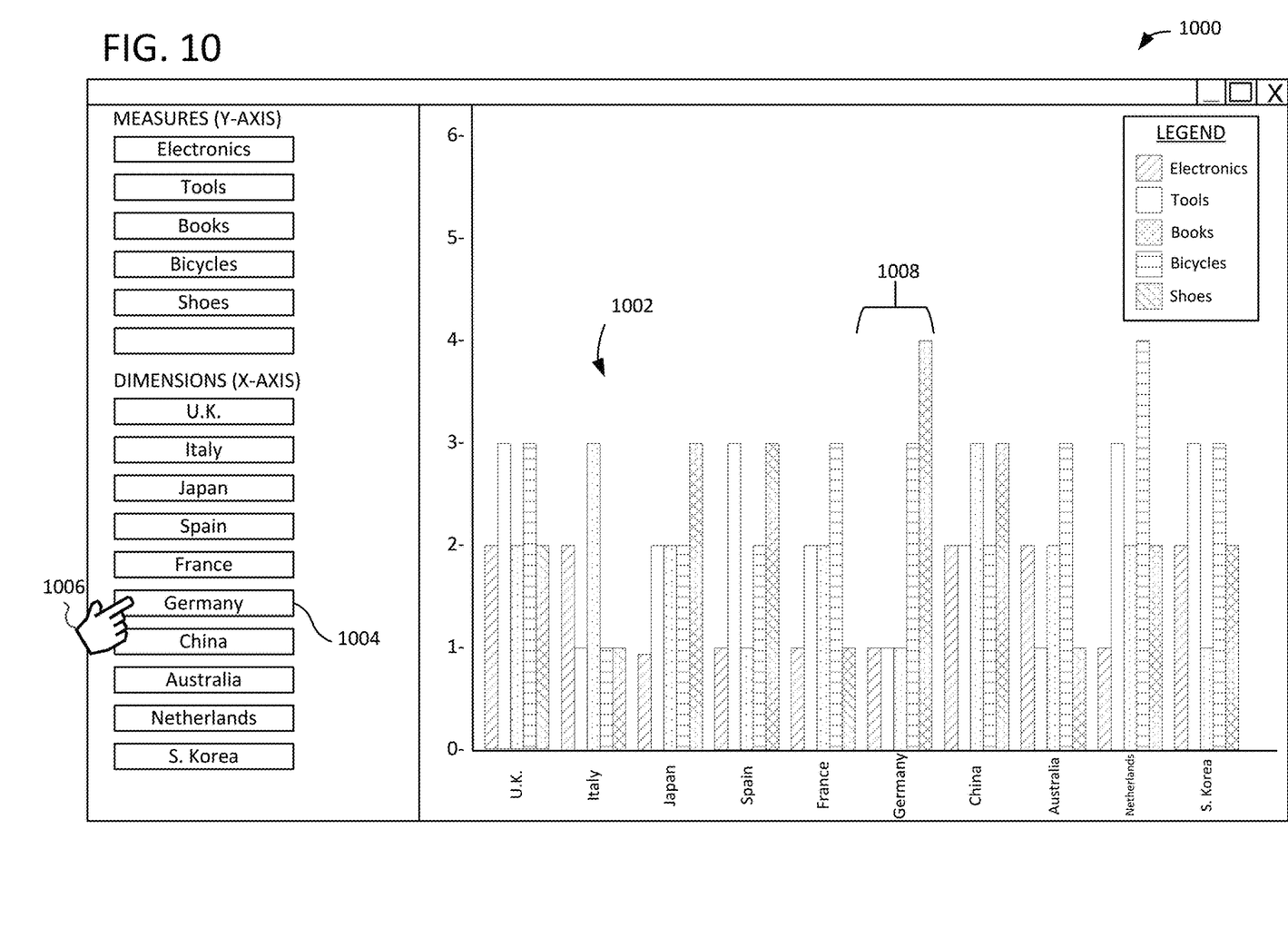
FIG. 10 is an example user interface of a visualization application in which a portion of a data visualization can be pinned, the data visualization having a bar chart visualization type.

FIG. 10 illustrates a user interface 1000, which is similar to the user interface 300 of FIG. 3. Data visualization 1002 is a different visualization type (bar chart) than data visualization 310 of FIG. 3 (stacked column chart). In FIG. 10, dimension 1004 ("Germany") is selected, illustrated by pointer 1006. In some examples, selection of dimension 1004 identifies the portion of interest as bar chart 1008 of data visualization 1002 corresponding to Germany. As a result of this selection, a pinned portion is generated, shown in FIG. 11.

FIG. 11 illustrates a user interface 1100 which is similar to the user interface 1000 of FIG. 10 with additional aspects visible related to pinning. Pinned portion 1102 includes pinned visualization content 1104 that corresponds to the selection of dimension 1004 in FIG. 10. Pinned portion 1102 includes a scale 1106 and an unpin control 1108. Pinned visualization content 1104 is zoomed-in relative to data visualization 1110, as illustrated by scale 1106. Pinned portion 1102 is presented over the portion of data visualization 1110 corresponding to pinned visualization content 1104.

Figure 12:
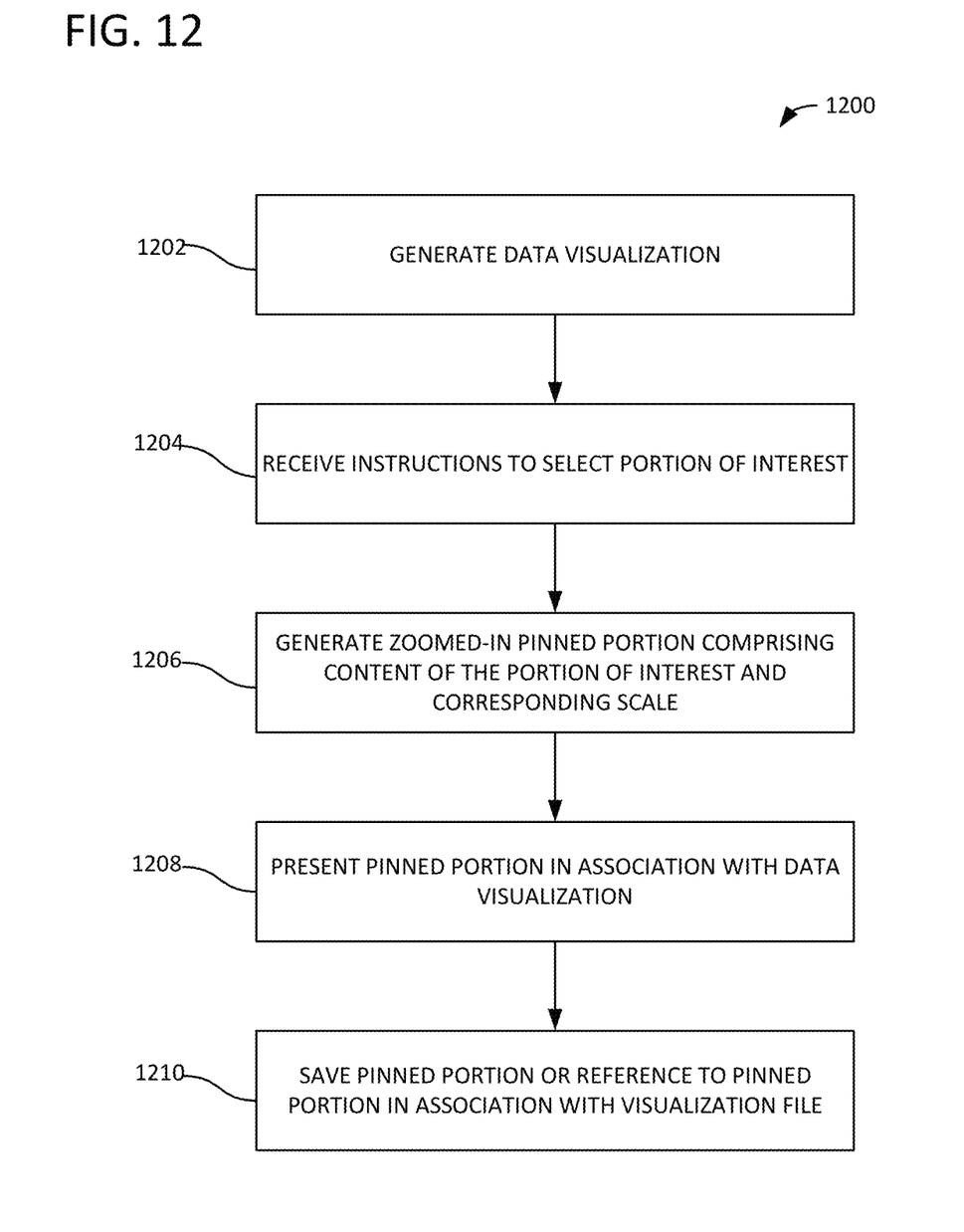
FIG. 12 illustrates an example method for pinning a portion of a data visualization in which the pinned portion is zoomed-in and includes a scale.

FIG. 12 illustrates a method 1200 of pinning a portion of a data visualization. In process block 1202, a data visualization is generated. The data visualization represents data in a dataset. In process block 1204, instructions are received to select a portion of interest of the data visualization. In process block 1206, a pinned portion of the data visualization is generated based on the selected portion of interest. The pinned portion includes pinned visualization content comprising at least some of the portion of interest of the data visualization. The pinned portion can also include a scale corresponding to a zoom level of the pinned visualization content. The zoom level of the pinned visualization content can be zoomed in relative to a zoom level of the portion of interest of the data visualization. In process block 1208, the pinned portion is presented in association with the data visualization. In process block 1210, at least one of the pinned portion or a reference to the pinned portion is saved in a visualization file corresponding to the data visualization.

Examples of Computing Environments

Figure 13:
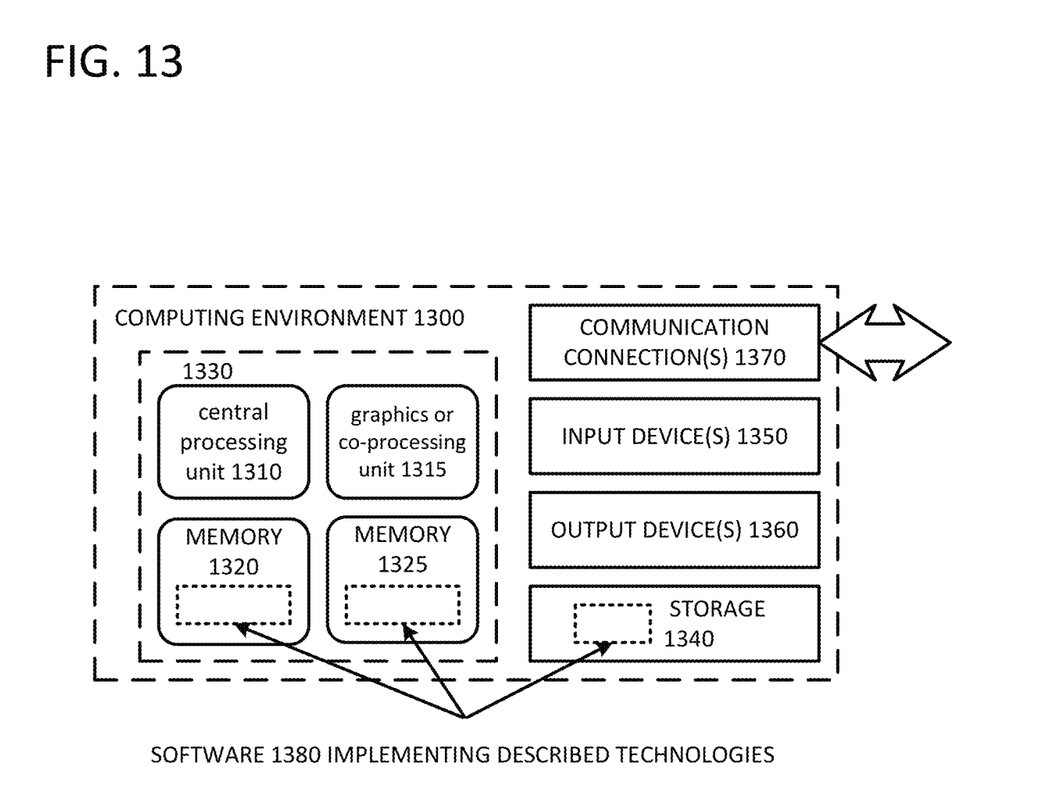
FIG. 13 is a diagram illustrating a generalized implementation environment in which some described examples can be implemented.

FIG. 13 depicts a generalized example of a suitable computing environment 1300 in which the described innovations may be implemented. The computing environment 1300 is not intended to suggest any limitation as to scope of use or functionality, as the innovations may be implemented in diverse general-purpose or special-purpose computing systems. For example, the computing environment 1300 can be any of a variety of computing devices (e.g., desktop computer, laptop computer, server computer, tablet computer, media player, gaming system, mobile device, etc.)

With reference to FIG. 13, the computing environment 1300 includes one or more processing units 1310, 1315 and memory 1320, 1325. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power.

For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s). The memory 1320, 1325 stores software 1380 implementing one or more innovations described herein, in the form of computer-executable instructions suitable for execution by the processing unit(s). For example, memory 1320 and 1325 and software 1380 can store computer-executable instructions for pinning portions of a data visualization. Computing environment 1300 can include visualization engine 104, input module 110, pinning module 114, search module 120, and indexer 122 of FIG. 1.

A computing system may have additional features. For example, the computing environment 1300 includes storage 1340, one or more input devices 1350, one or more output devices 1360, and one or more communication connections 1370. An interconnection mechanism (not shown) such as a bus, controller, or network interconnects the components of the computing environment 1300. Typically, operating system software (not shown) provides an operating environment for other software executing in the computing environment 1300, and coordinates activities of the components of the computing environment 1300.

The tangible storage 1340 may be removable or non-removable, and includes magnetic disks, magnetic tapes or cassettes, CD-ROMs, DVDs, or any other medium which can be used to store information and which can be accessed within the computing environment 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing environment 1300. For video encoding, the input device(s) 1350 may be a camera, video card, TV tuner card, or similar device that accepts video input in analog or digital form, or a CD-ROM or CD-RW that reads video samples into the computing environment 1300. The output device(s) 1360 may be a display, printer, speaker, CD-writer, or another device that provides output from the computing environment 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. One or more computer-readable storage media storing computer-executable instructions for:
    generating a data visualization, the data visualization representing data in a dataset;
    receiving instructions to select a portion of interest of the data visualization;
    generating a pinned portion of the data visualization, the pinned portion being a window containing pinned visualization content, the pinned visualization content comprising both a subset of the data represented in the data visualization and scale indicators corresponding to data values for the subset of the data; and
    presenting the window containing the pinned visualization content in association with the data visualization, wherein the data visualization and the window containing the pinned portion are presented in a user interface, wherein the scale indicators correspond to data values that are common to both the pinned visualization content and the data visualization and are configured to indicate a zoom level of the pinned visualization content relative to the data visualization, and wherein the window containing the pinned portion provides a user-selectable zoom-level control that allows a user to adjust the zoom level of the pinned visualization content indicated by the scale indicators.

2. The one or more computer-readable storage media of claim 1, wherein the pinned visualization content is zoomed in relative to the data visualization.

3. The one or more computer-readable storage media of claim 1, wherein presenting the pinned portion in association with the data visualization comprises presenting the pinned portion at least partially over the selected portion of interest of the data visualization.

4. The one or more computer-readable storage media of claim 1, wherein the pinned portion comprises an unpin control.

5. The one or more computer-readable storage media of claim 1, wherein the pinned portion comprises a label corresponding to the subset of the data, and wherein the label further corresponds to a data label presented in the data visualization.

6. The computer-readable media of claim 1, wherein the data visualization is a plot of dimensions versus measures, and wherein the pinned visualization content of the pinned portion includes a plot of at least one of:
  (i) a single measure and multiple dimensions from the data visualization, wherein the single measure is selectable by a user performing a user input action on the selected measure or selecting the measure from a menu comprising multiple measures or
  (ii) a single dimension and multiple measures from the data visualization, wherein the single dimension is selectable by a user performing a user input action on the selected dimension or selecting the dimension from a menu comprising multiple dimensions.

7. The one or more computer-readable storage media of claim 1, wherein the instructions further comprise saving the pinned portion, wherein saving the pinned portion comprises:
  saving the pinned portion in a first visualization file corresponding to the data visualization, or
  saving the pinned portion in a second visualization file separate from the first data visualization file and providing a reference link in the first visualization file to the second visualization file.

8. The one or more computer-readable storage media of claim 7, wherein the first visualization file is identifiable through a search for visualization files having an associated pinned portion.

9. The one or more computer-readable storage media of claim 7, wherein the instructions further comprise upon reopening the first visualization file after the first visualization file has been closed, presenting the pinned portion in association with the data visualization without opening the second visualization file.

10. The one or more computer-readable storage media of claim 1, wherein the pinned portion is a first pinned portion, and wherein the instructions further comprise:
  receiving instructions to select a second portion of interest of the data visualization;
  generating a second pinned portion of the data visualization, the second pinned portion having second pinned visualization content comprising at least some of the second portion of interest of the data visualization; and
  presenting the second pinned portion in association with the data visualization.

11. The one or more computer-readable storage media of claim 10, wherein the instructions further comprise linking and saving the first pinned portion and the second pinned portion together in a single data visualization file corresponding to the data visualization.

12. The one or more computer-readable storage media of claim 1, wherein the scale indicators are numerical scale indicators.

13. The one or more computer-readable storage media of claim 1, wherein the user-selectable zoom-level control is contained within the window containing the pinned portion.

14. One or more computing devices implementing a system, the system comprising:
  a visualization engine configured to generate a data visualization that represents data in a dataset, wherein the data visualization is a plot of dimensions versus measures;
  an input module configured to receive instructions selecting a portion of interest of the data visualization; and
  a pinning module configured to:
    generate a first pinned portion of the data visualization based on a first selected portion of interest, the first pinned portion including, in a single window, a single measure or a single dimension from the first selected portion of interest of the data visualization, a scale corresponding to data values for the single measure or single dimension that is different from the scale of the data visualization, wherein the scale utilizes data value indicators that are common to both the first pinned portion and the data visualization and are configured to indicate a zoom level of the first pinned portion relative to the data visualization, and a label corresponding to the single measure or single dimension, wherein the label corresponds to a data label in the data visualization;
    present the first pinned portion in association with the data visualization;
    save the first pinned portion in association with a visualization file corresponding to the data visualization;
    generate a second pinned portion based on a second selected portion of interest, wherein the first selected portion of interest is generated based on input received from a first user and the second selected portion of interest is generated based on input received from a second user; and
    save the second pinned portion in association with the visualization file corresponding to the data visualization, wherein the data visualization file is configured to:
      responsive to a request from the first user to open the data visualization file, load the data visualization and the first pinned portion, and
      responsive to a request from the second user to open the data visualization file, load the data visualization and the second pinned portion.

15. The one or more computing devices of claim 14, wherein the system further comprises a search module configured to identify data visualization files having associated saved pinned portions.

16. The one or more computing devices of claim 14, wherein the system further comprises an indexer configured to:
  determine that the visualization file has an associated pinned portion; and
  index the visualization file based on at least one of: one or more labels or keywords associated with the pinned visualization content of the pinned portion, a user associated with the pinned portion, or the presence of the pinned portion.

17. A computer-implemented method comprising:
  generating a data visualization, the data visualization representing data in a dataset in a graph or chart;
  receiving instructions to select a single measure from among a plurality of measures or a single dimension from among a plurality of dimensions represented in the graph or chart;
  generating a pinned portion of the data visualization for the selected measure or dimension, the pinned portion comprising:

the selected measure or dimension represented in the graph or chart;

a scale corresponding to the selected measure or dimension, wherein the scale utilizes indicators that are common to both the pinned portion and the data visualization and are configured to indicate a zoom level of the pinned portion relative to the data visualization; and at least one label corresponding to the selected measure or dimension and not to any unselected measures or dimensions, wherein the label also corresponds to a data label in the data visualization;

presenting the pinned portion in association with the data visualization, wherein the presenting comprises:

visually presenting the pinned portion in a movable window that is movable from a first position in which the movable window at least partially overlaps the selected measure or dimension in the data visualization to a second position in which the movable window does not overlap the selected measure or dimension in the data visualization, such that the pinned portion and the selected measure or dimension in the data visualization can be viewed simultaneously; and saving at least one of the pinned portion or a reference to the pinned portion in a visualization file corresponding to the data visualization.

18. The computer-implemented method of claim 17, wherein at least one of (i) multiple pinned portions generated in response to pinning selections by different users or (ii) references to multiple pinned portions generated in response to pinning selections by different users are saved in the visualization file.

19. The computer-implemented method of claim 17, wherein the pinned portion is saved as a second visualization file separate from the visualization file corresponding to the data visualization.

20. The computer implemented method of claim 17, wherein the data visualization comprises a first data visualization type, and further wherein the presented pinned portion comprises a second data visualization type that is different from the first data visualization type.

* * * * *